(12) United States Patent
Fortman et al.

(10) Patent No.: US 11,161,965 B2
(45) Date of Patent: Nov. 2, 2021

(54) POLYMER COMPOSITIONS STABILIZED WITH ORGANOPOLYSULFIDES

(71) Applicant: Arkema Inc., King of Prussia, PA (US)

(72) Inventors: George Charles Fortman, Conshohocken, PA (US); Jonathan Pearce Stehman, Wilmington, DE (US); Stephanie Christina Vrakas, Greenville, DE (US); Kurt Wood, Abington, PA (US)

(73) Assignee: Arkema Inc., King of Prussia, PA (US)

( * ) Notice: Subject to any disclaimer, the term of this patent is extended or adjusted under 35 U.S.C. 154(b) by 155 days.

(21) Appl. No.: 16/293,820

(22) Filed: Mar. 6, 2019

(65) Prior Publication Data

US 2019/0194423 A1    Jun. 27, 2019

Related U.S. Application Data

(63) Continuation-in-part of application No. PCT/US2018/039901, filed on Jun. 28, 2018.

(60) Provisional application No. 62/526,536, filed on Jun. 29, 2017.

(51) Int. Cl.

| | | |
|---|---|---|
| *C08K 5/32* | (2006.01) | |
| *C08K 5/372* | (2006.01) | |
| *C08L 25/06* | (2006.01) | |
| *C08L 27/16* | (2006.01) | |
| *C08L 23/06* | (2006.01) | |
| *C08L 23/12* | (2006.01) | |
| *C08L 33/04* | (2006.01) | |
| *C09D 127/16* | (2006.01) | |
| *C08L 81/04* | (2006.01) | |
| *C08K 5/00* | (2006.01) | |
| *C08K 5/40* | (2006.01) | |
| *C08L 33/12* | (2006.01) | |

(52) U.S. Cl.
CPC .............. *C08K 5/372* (2013.01); *C08K 5/005* (2013.01); *C08K 5/40* (2013.01); *C08L 23/06* (2013.01); *C08L 23/12* (2013.01); *C08L 25/06* (2013.01); *C08L 27/16* (2013.01); *C08L 33/04* (2013.01); *C08L 33/12* (2013.01); *C08L 81/04* (2013.01); *C09D 127/16* (2013.01); *C08L 2201/08* (2013.01); *C08L 2203/206* (2013.01)

(58) Field of Classification Search
CPC .......... C08K 5/372; C08K 5/005; C08K 5/40; C08L 33/04; C08L 81/04; C08L 33/12; C08L 23/06; C08L 23/12; C08L 27/16; C08L 25/06; C08L 2201/08; C08L 2203/206; C09D 127/16

See application file for complete search history.

(56) References Cited

U.S. PATENT DOCUMENTS

| | | | |
|---|---|---|---|
| 3,269,980 A * | 8/1966 | Heuck .................... | C08L 23/02 524/324 |
| 3,703,454 A | 11/1972 | Nakase et al. | |
| 3,843,600 A | 10/1974 | Robin et al. | |
| 3,882,058 A * | 5/1975 | Le Brasseur .......... | C08K 5/372 523/126 |
| 3,978,022 A | 8/1976 | Carson, Jr. | |
| 4,535,127 A | 8/1985 | Matsuzaki et al. | |
| 5,258,422 A * | 11/1993 | Chang .................. | C08K 5/0033 523/124 |
| 5,912,212 A * | 6/1999 | Igarashi ............... | C10M 141/06 508/275 |
| 6,214,915 B1 | 4/2001 | Avakian et al. | |
| 6,472,447 B1 | 10/2002 | Lorenz et al. | |
| 6,525,158 B1 | 2/2003 | Hoffmann et al. | |
| 10,214,627 B2 | 2/2019 | Van Mierloo et al. | |
| 2008/0181969 A1 | 7/2008 | Blanton et al. | |
| 2008/0269085 A1* | 10/2008 | Haire .................. | C10M 141/12 508/151 |
| 2011/0144246 A1 | 6/2011 | Dabbous et al. | |
| 2016/0168382 A1 | 6/2016 | Blackburn et al. | |
| 2017/0051128 A1 | 2/2017 | Hill et al. | |

FOREIGN PATENT DOCUMENTS

| | | |
|---|---|---|
| CN | 103937447 A | 7/2014 |
| GB | 2 043 079 A | 10/1980 |

OTHER PUBLICATIONS

"Polymer Additivies for the Plastic Industry Overview", Clariant International Ltd; Switzerland Business Unit Additives pp. 1-16.

* cited by examiner

*Primary Examiner* — Robert C Boyle
(74) *Attorney, Agent, or Firm* — Steven D. Boyd

(57) ABSTRACT

Organopolysulfides such as organodisulfides, organotrisulfides and/or organotetrasulfides are useful stabilizers for polymer compositions, wherein the tendency of a polymer to degrade when exposed to environmental conditions such as heat, light and oxygen may be ameliorated by the incorporation of one or more of such organopolysulfides, optionally together with one or more additional stabilization additives such as a hindered phenol antioxidant, phosp(on)ite stabilizer or hindered amine light stabilizer.

15 Claims, 9 Drawing Sheets

Reduction in Weight Loss Compared to Control

HDPE Isothermal Gravametric Analysis - Percent Weight Loss after 2h at 260 °C

LDPE Isothermal Gravametric Analysis - Percent Weight Loss after 6h at 260 °C

Comparison of Yellowness Index

Comparison of Yellowness Index

Yellowness Index Change As A Function of Additive Packages

Melt Flow Index of the Formulations Before and After Processing

POLYMER COMPOSITIONS STABILIZED WITH ORGANOPOLYSULFIDES

CROSS-REFERENCE TO RELATED APPLICATION

This application is a continuation-in-part of International Application No. PCT/US2018/039901, filed Jun. 28, 2018, which claims priority to U.S. Provisional Application No. 62/526,536, filed Jun. 29, 2017, the entire disclosures of which are incorporated herein by reference for all purposes.

FIELD OF THE INVENTION

The invention relates to polymer compositions that have been stabilized with organodisulfides, organotrisulfides and/or organotetrasulfides, optionally in combination with one or more further additives such as hindered phenol antioxidants, phosph(on)ites, and/or hindered amine light stabilizers.

BACKGROUND OF THE INVENTION

Although polymers are useful materials for the fabrication of various different types of finished articles, they are generally susceptible to degradation at elevated temperatures such as those employed during processing of a polymer or those encountered during normal use of a polymeric article intended to be exposed to relatively harsh conditions. Moreover, it is important in many end-use applications that polymeric articles remain functional and attractive in appearance over an extended service life, even if they are not subjected to extreme environmental stresses. Decomposition of a polymer can result in undesirable changes in the appearance (e.g., color) and the physical and mechanical properties of the polymeric article. For these reasons, stabilizers of various types are typically incorporated into polymers in order to enhance their resistance to degradation. However, polymer stabilization is still an empirical art and generally it is not possible to predict with reasonable certainty whether a given additive will or will not be effective as a stabilizer. Moreover, compounds which suitably stabilize one type of polymer may not exhibit similar effects when incorporated into other types of polymers.

Phenolic compounds, particularly hindered phenol compounds, have conventionally been used as antioxidants in polymer formulations. When exposed to oxygen at high temperatures, such compounds can ultimately degrade and form species that are highly colored. That is, the antioxidants traditionally used to stabilize polymers, especially polyolefins, can become over-oxidized when a polymer containing such an antioxidant is melt processed repeatedly or over long periods of time, leading to the formation of color bodies. See Pospisil et al., "Discoloration of polymers by phenolic antioxidants," Polymer Degradation and Stability 2002, 77, pp. 531-538. Some of the species formed by degradation of the antioxidants are very intensely colored; in some cases, the presence of only a few parts per million of such species causes a noticeable change in the appearance of the polymer formulation.

Accordingly, the development of alternative polymer stabilization technologies would be highly desirable.

SUMMARY OF THE INVENTION

A polymer composition comprised of at least one polymer is stabilized by incorporating therein an organopolysulfide stabilizer component comprised of at least one organopolysulfide selected from the group consisting of organodisulfides, organotrisulfides and organotetrasulfides. Further improvements in stabilization can be achieved through the incorporation of one or more further additives, such as antioxidants (e.g., hindered phenol antioxidants, phosph(on)ite stabilizers) and/or light stabilizers (e.g., hindered amine light stabilizers). The resulting stabilized polymer composition exhibits improved resistance to degradation (in particular, at elevated temperatures), as compared to a polymer composition which does not contain any stabilizer. The presence of the organopolysulfide stabilizer component in the polymer results in an increased stability of the polymer towards typical decompositional stresses such as heat or light from processing or weathering. Such stabilization effects can be quantified by a lowered residual monomer content retained in the polymer matrix after processing, a higher temperature at which a certain level of weight loss is observed as a result of polymer decomposition, a lower degree of color development (e.g., less of an increase in yellowness index) following exposure to high temperatures, or a higher retention of molecular weight following exposure to heat, light or other environmental conditions which stress the integrity of the polymer chain.

DETAILED DESCRIPTION OF CERTAIN EMBODIMENTS OF THE INVENTION

Organopolysulfides

Figure 1:
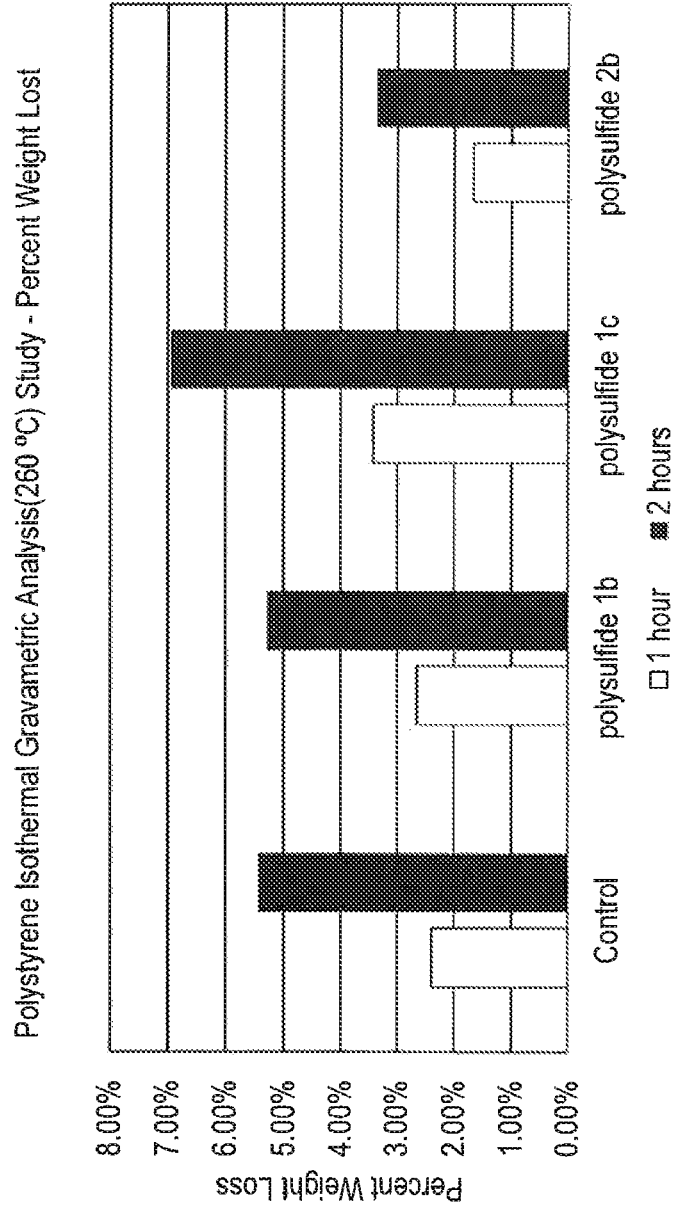
FIGS. 1-13 are graphic representations of certain experimental results, as further explained in the Examples.

The stabilized polymer compositions of the present invention are comprised of at least one polymer and an organopolysulfide stabilizer component comprised of at least one organopolysulfide selected from the group consisting of organodisulfides, organotrisulfides and organotetrasulfides. Such organopolysulfides have been found to be particularly effective in improving the stability of polymers, especially with respect to their thermal stability (i.e., their ability to resist degradation when heated). Generally speaking, organomonosulfides compounds corresponding to the general formula R-S-R, where each R group is an organic moiety) do not provide the same level of polymer stabilization as the analogous organodisulfide (R-SS-R), organotrisulfide (R-SSS-R) species, or organotetrasulfide (R-SSSS-R) species. The use of higher organopolysulfides (e.g., organopentasulfides R-SSSSS-R and organohexasulfides R-SSSSSS-R) as stabilizers in polymer compositions has been found to generally not be suitable, as the presence of such higher organopolysulfides often leads to severe odor issues and problems with the formation of elemental sulfur when the polymer compositions are heated.

For these reasons, in various advantageous embodiments of the present invention, the organopolysulfide stabilizer component present in the stabilized polymer composition is characterized by having a total content of organopolysulfides other than organodisulfides, organotrisulfides and organotetrasulfides of less than 30%, less than 25%, less than 20%, less than 15%, less than 10% or less than 5% by weight, based on the total weight of organopolysulfides present in the stabilized polymer composition. In still other embodiments, the organopolysulfide stabilizer component present in the stabilized polymer composition is characterized by having a content of organosulfide compounds other than organodisulfides, organotrisulfides and organotetrasulfides of less than 30%, less than 25%, less than 20%, less than 15%, less than 10% or less than 5% by weight, based on the total weight of organosulfide compounds (i.e., organomonosulfides organopolysulfides) present in the stabilized polymer composition.

In the context of the present invention, an organodisulfide is considered to be a compound containing at least one disulfide linkage (-SS-) interposed between two organic moieties, wherein the organic moieties may be the same as or different from each other. Likewise, an organotrisulfide is considered to be a compound containing at least one trisulfide linkage (-SSS-) interposed between two organic moieties and an organotetrasulfide is considered to be a compound containing at least one tetrasulfide linkage (-SSSS-) interposed between two organic moieties, wherein the organic moieties may be the same as or different from each other. Organodisulfides, organotrisulfides and organotetrasulfides useful in the present invention may contain two or more SS-, -SSS- and/or SSSS- linkages per molecule. For example, the organopolysulfide stabilizer component may comprise a compound corresponding to the general structure R-SS-Q-SS-R or R-SSS-Q-SSS-R, wherein each R and Q is an organic moiety.

The organopolysulfide stabilizer component may comprise at least one organodisulfide, but no organotrisulfide. In another embodiment, the organopolysulfide stabilizer component may comprise at least one organotrisulfide, but no organodisulfide. In a particularly advantageous embodiment, the organopolysulfide stabilizer component comprises at least one organodisulfide, at least one organotrisulfide, and at least one organotetrasulfide. For example, the organopolysulfide stabilizer component may comprise, consist essentially of or consist of one or more organodisulfides, one or more organotrisulfides, and one or more organotetrasulfides in a weight ratio of organotrisulfide: (organodisulfide+organotetrasulfide) of from about 70:30 to about 90:10. In certain embodiments of the invention, the organopolysulfide stabilizer component contains not more than 10% or not more than 5% by weight in total of organopentasulfide and higher organopolysulfides (i.e., the organopolysulfide stabilizer component is comprised of 0-10 or 0-5% by weight in total of species containing polysulfide sequences-S-(S)$_n$-, where n is 4 or higher).

The structures and identities of the organic moieties present in the organodisulfides, organotrisulfides and organotetrasulfides are not considered to be particularly critical and may be varied and selected as may be needed to improve or modify the compatibility of the organopolysulfide stabilizer component with the polymer matrix in which it is incorporated. Without wishing to be bound by theory, it is believed that the organic moieties may assist in dispersing and/or solubilizing the organopolysulfide stabilizer component in the polymer composition. Accordingly, the organic moieties may be chosen depending upon the polymer to be stabilized.

Suitable organic moieties include, for example, alkyl groups, aryl groups, and/or aralkyl groups, including substituted and heteroatom-containing variants thereof as will be explained in more detail subsequently.

In one aspect of the invention, the organodisulfide, organotrisulfide or organotetrasulfide corresponds to the general formula (I):

$$R^1\text{-S-S}_x\text{-R}^2 \qquad (I)$$

wherein $R^1$ and $R^2$ are organic moieties which are the same as or different from each other and x is 1 (providing an organodisulfide), 2 (providing an organotrisulfide) or 3 (providing an organotetrasulfide). Each R group may be saturated or unsaturated. Each R group may optionally contain one or more ring structures, including alicyclic, aromatic and heteroaromatic ring structures. Mixtures of different organodisulfides, organotrisulfides and organotetrasulfides may be utilized.

Each R group may be an organic moiety containing from 1 to 30 carbon atoms and optionally also containing one or more hydrogen atoms and/or one or more heteroatoms. The heteroatoms optionally present in one or both R groups may be, for example, N, O, S, Se, P, halide or the like or combinations thereof. The group R in formula (I) will be described in further detail below; the group R will be indicated by the name of a monovalent group to which one sulfur atom is bonded. In formula (I), each of $R^1$ and $R^2$ may, for example, represent an aliphatic hydrocarbon group that optionally has at least one substituent, an alicyclic hydrocarbon group that optionally has at least one substituent, an aromatic hydrocarbon group that optionally has at least one substituent, a heterocyclic group that optionally has at least one substituent, or an oxyalkylene-containing group. The term "aliphatic hydrocarbon group" encompasses an alkyl group, an alkenyl group and an alkynyl group.

Examples of an "alkyl group" include a methyl group, an ethyl group, an n-propyl group, an i-propyl group, an n-butyl group, an s-butyl group, an i-butyl group, a t-butyl group, an n-pentyl group, an n-hexyl group, a nonyl group, an i-nonyl group, a decyl group, a lauryl group, a tridecyl group, a myristyl group, a pentadecyl group, a palmityl group, a heptadecyl group, and a stearyl group. A $C_6$-$C_{25}$ or $C_8$-$C_{16}$ alkyl group may be used, for example. Examples of an "alkenyl group" include a vinyl group, a 1-propenyl group, a 2-propenyl group, a 1-butenyl group, a 2-butenyl group, a 3-butenyl group, a 1-methyl-2-propenyl group, a 2-methyl-2-propenyl group, a 1-pentenyl group, a 2-pentenyl group, a 3-pentenyl group, a 4-pentenyl group, a 1-methyl-2-butenyl group, a 2-methyl-2-butenyl group, a 1-hexenyl group, a 2-hexenyl group, a 3-hexenyl group, a 4-hexenyl group, a 5-hexenyl group, a heptenyl group, an octenyl group, a decenyl group, a pentadecenyl group, an eicosenyl group, and a tricosenyl group. A $C_6$-$C_{25}$ alkenyl group may be used, for example.

Examples of an "alkynyl group" include an ethynyl group, a 1-propynyl group, a 2-propynyl group, a 1-butyryl group, a 2-butynyl group, a 3-butynyl group, a 1-methyl-2-propynyl group, a 2-methyl-2-propynyl group, a 1-pentynyl group, a 2-pentynyl group, a 3-pentynyl group, a 4-pentynyl group, a 1-methyl-2-butynyl group, a 2-methyl-2-butynyl group, a 1-hexynyl group, a 2-hexynyl group, a 3-hexynyl group, a 4-hexynyl group, a 5-hexynyl group, a 1-heptynyl group, a 1-ortynyl group, a 1-decynyl group, a 1-pentadecynyl group, a 1-eicosynyl group, and a 1-tricosynyl group. A $C_6$-$C_{25}$ alkynyl group may be used, for example. The term "alicyclic hydrocarbon group" refers to a monocyclic or polycyclic alkyl group, alkenyl group, and the like, and examples thereof include a cyclopropyl group, a cyclobutyl group, a cyclopentyl group, a cyclohexyl group, a cycloheptyl group, a cyclooctyl group, a cyclododecyl group, a bicyclooctyl group, a bicycloheptyl group, a norbornyl group, an adamantyl group, a 2-cyclopropenyl group, a 2-cyclopentenyl group, and a 4-cyclohexenyl group. A $C_3$-$C_8$ cycloalkyl group may be used, for example.

The term "aromatic hydrocarbon group" means a monocyclic or polycyclic aryl group. Here, in the case of a polycyclic aryl group, the term aromatic hydrocarbon group also encompasses a partially saturated group in addition to a fully unsaturated group. Examples thereof include a phenyl group, a naphthyl group, an azulenyl group, an indenyl group, an indanyl group, and a tetralinyl group. A $C_6$-$C_{10}$ aryl group may be used, for example.

The term "heterocyclic group" means a 5- to 7-membered aromatic heterocycle, saturated heterocycle or unsaturated heterocycle having 1 to 4 nitrogen atoms, oxygen atoms or sulfur atoms as a hetero atom(s), or a condensed heterocycle in which any of these heterocycles is condensed with another carbocyclic (e.g., benzene) or heterocyclic ring. Examples thereof include a furan-2-yl group, a furan-3-yl group, a thiophen-2-yl group, a thiophen-3-yl group, a pyrrol-1-yl group, a pyrrol-2-yl group, a pyridin-2-yl group, a pyridin-3-yl group, a pyridin-4-yl group, a pyrazin-2-yl group, a pyrazin-3-yl group, a pyrimidin-2-yl group, a pyrimidin-4-yl group, a pyridazin-3-yl group, a pyridazin-4-yl group, a 1,3-benzodioxol-4-yl group, a 1,3-benzodioxol-5-yl group, a 1,4-benzodioxan-5-yl group, a 1,4-benzodioxan-6-yl group, a 3,4-dihydro-2H-1,5-benzodioxepin-6-yl group, a 3,4-dihydro-2H-1,5-benzodioxepin-7-yl group, a 2,3-dihydrobenzofuran-4-yl group, a 2,3-dihydrobenzofuran-5-yl group, a 2,3-dihydrobenzofuran-6-yl group, a 2,3-dihydrobenzofuran-7-yl group, a benzofuran-2-yl group, a benzofuran-3-yl group, a benzothiophen-2-yl group, a benzothiophen-3-yl group, a quinoxalin-2-yl group, a quinoxalin-5-yl group, an indol-1-yl group, an indol-2-yl group, an isoindol-1-yl group, an isoindol-2-yl group, an isobenzofuran-1-yl group, an isobenzofuran-4-yl group, a chromen-2-yl group, a chromen-3-yl group, an imidazol-1-yl group, an imidazol-2-yl group, an imidazol-4-yl group, a pyrazol-1-yl group, a pyrazol-3-yl group, a thiazol-2-yl group, a thiazol-4-yl group, an oxazol-2-yl group, an oxazol-4-yl group, an isoxazol-3-yl group, an isoxazol-4-yl group, a pyrrolidin-2-yl group, a pylrolidin-3-yl group, a benzoimidazol-1-yl group, a benzoimidazol-2-yl group, a benzothiazol-2-yl group, a benzothiazol-4-yl group, a benzoxazol-2-yl group, a benzoxazol-4-yl group, a quinolin-2-yl group, a quinolin-3-yl group, an isoquinolin-1-yl group, an isoquinolin-3-yl group, a 1,3,4-thiadiazol-2-yl group, a 1,2,3-triazol-1-yl group, a 1,2,3-triazol-4-yl group, a tetrazol-1-yl group, a tetrazol-2-yl group, an indolin-4-yl group, an indolin-5-yl group, a morpholin-4-yl group, a piperazin-2-yl group, a piperidin-2-yl group, a 1,2,3,4-tetrahydroquinolin-5-yl group, a 1,2,3,4-tetrahydroquinolin-6-yl group, a 1,2,3,4-tetrahydroisoquinolin-5-yl group, and a 1,2,3,4-tetrahydroisoquinolin-6-yl group. In one embodiment, R is a 1,3,4-thiadiazole group.

The term "ether-containing group" means an organic moiety containing one or more ether linkages, such as, for example, an oxyalkylene-containing group. An oxyalkylene-containing group may be a group that contains at least one moiety having general structure -O-$(CH_2)_o$-wherein o is an integer of at least 1 (e.g., 1, 2, 3, 4, etc.) and one or more of the hydrogen atoms in the $CH_2$ moieties may be replaced with a substituent such as an alkyl group (e.g., methyl or ethyl), aryl group or heterocyclic moiety.

Particularly advantageous examples of organopolysulfides which can be utilized in the present invention include, but are not limited to:

Dialkyldisulfides, dialkyltrisulfides and dialkyltetrasulfides, in particular organopolysulfides having structure $R^1$-S$(S)_x$-$R^2$, wherein x is 1, 2 or 3, and $R^1$ and $R^2$ are independently selected from $C_1$-$C_{30}$ alkyl groups, in particular $C_8$-$C_{16}$ alkyl groups or $C_{10}$-$C_{14}$ alkyl groups (e.g., tert-dodecyl), including combinations thereof (e.g., mixtures of dialkyldisulfides and dialkyltrisulfides or mixtures of dialkyldisulfides, dialkyltrisulfides and dialkyltetrasulfides corresponding to the foregoing structure).

Aromatic polysulfides of the following formula:

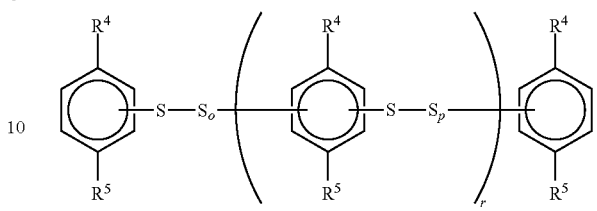

wherein each $R^4$ is independently tert-butyl or tert-amyl, $R^5$ is hydroxyl (—OH), o and p are each independently 0 or 1, with at least one of o or p being 1, and r is 0 or an integer of 1 or more (e.g., r=0-6), with the aromatic rings being optionally substituted in one or more positions with substituents other than hydrogen (e.g., halogen, alkyl, alkoxy), including combinations of such aromatic polysulfides. In one embodiment of the invention, none of the aromatic rings are substituted at positions ortho to the $R^5$ (hydroxyl) group with substituents other than hydrogen. Vultac® 2 and Vultac® 3, which are products sold by The Arkema Group, are examples of such suitable aromatic polysulfides (Vultac® 2: r=1, each $R^5$=t-amyl, o=1, p=1; Vultac® 3: r=3-5, each $R^5$=t-amyl, o=1, p=1).

Thiuram polysulfides, particularly tetraalkyl thiuram disulfides corresponding to the following formula:

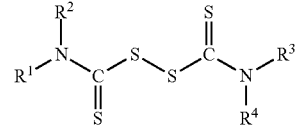

wherein $R^1$, $R^2$, $R^3$ and $R^4$ are alkyl groups which may be the same as or different from each other, in particular C11-C24 alkyl groups (e.g., methyl, ethyl).

Organopolysulfides useful in the present invention are well known in the art and may be prepared by any appropriate method. Suitable organopolysulfides are also available from commercial sources, such as The Arkema Group.

Polymers

The polymer employed in the present invention may be any type of polymer known in the art and may be, for example, a thermoplastic polymer, a thermoset polymer, an elastomer, a thermoplastic elastomer, a non-crosslinked polymer, or a crosslinked polymer. Mixtures, blends or alloys of two or more different types of polymer may also be used.

The invention is particularly useful for the stabilization of thermoplastics such as polyolefins (also referred to as polyolefin resins, e.g., polyethylene, polypropylene), styrenic resins (e.g., polystyrenes), acrylic resins (also referred to as polyacrylates, e.g., polymethyl methacrylates) and polyacetals (e.g., polyoxymethylene resins).

In general, polymers which can be stabilized in accordance with the present invention include, but are not limited to:

A. Polymers of monoolefins and diolefins, for example polyethylenes (which optionally can be crosslinked), polypropylenes, polyisobutylene, polybutene-1, polymethylpentene-1, polyisoprene or polybutadiene, as well as polymers of cycloolefins, for instance of cyclopentene or norbornene.

B. Mixtures of the polymers mentioned under A), for example mixtures of polypropylene with polyisobutylene.

C. Copolymers of monoolefins and diolefins with each other or with other vinyl monomers, such as, for example, ethylene/propylene, propylene/butene-1, propylene/isobutylene, ethylene/butene-1, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidene-norbornene.

D. Polystyrene, poly-(p-methylstyrene).

E. Copolymers of styrene or methylstyrene with dienes or acrylic derivatives, such as, for example, styrene/butadiene, styrene/acrylonitrile, styrene/ethyl methacrylate, styrene/butadiene/ethyl acrylate, styrene/acrylonitrile/methyl acrylate; mixtures of high impact strength from styrene copolymers and another polymer, such as, for example, from a polyacrylate, a diene polymer or an ethylene/propylene/diene terpolymer; and block polymers of styrene, such as, for example, styrene/butadiene/styrene, styrene/isoprene/styrene, styrene/ethylene/butylene/styrene or styrene/ethylene/propylene/styrene.

F. Graft copolymers of styrene, such as, for example, styrene on polybutadiene, styrene and acrylonitrile on polybutadiene, styrene and alkyl acrylates or methacrylates polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under E), for instance the copolymer mixtures known as ABS-, MBS-, ASA- or AES-polymers.

G. Halogen-containing polymers, including chloropolymers and fluoropolymers, such as polychloroprene, chlorinated rubbers, chlorinated or sulfochlorinated polyethylene, epichlorohydrin homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/vinylidene chloride, vinyl chloride/vinyl acetate, vinylidene chloride/vinyl acetate copolymers, or vinyl fluoride/vinyl ether copolymers.

H. Polymers which are derived from alpha, beta-unsaturated acids and derivatives thereof (e.g., esters of alpha, beta-unsaturated acids), such as polyacrylates and polymethacrylates, polyacrylamide and polyacrylonitrile.

I. Copolymers from the monomers mentioned under H) with each other or with other unsaturated monomers, such as, for instance, acrylonitrile/butadiene, acrylonitrile/alkyl acrylate, acrylonitrile/alkoxyalkyl acrylate or acrylonitrile/vinyl halogenide copolymers or acrylonitrile/alkyl methacrylate/butadiene terpolymers.

J. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinyl-butyral, polyallyl phthalate or polyallyl-melamine.

K. Homopolymers and copolymers of cyclic ethers, such as polyalkylene glycols, polyethylene oxide, polypropylene oxide or copolymers thereof with bis-glycidyl ethers.

L. Polyacetals, such as polyoxymethylene and those polyoxymethylenes which contain ethylene oxide as comonomer.

M. Polyphenylene oxides and sulfides, and mixtures of polyphenylene oxides with polystyrene.

N. Polyurethanes which are derived from polyethers, polyesters or polybutadiens with terminal hydroxyl groups on the one side and aliphatic or aromatic polyisocyanates on the other side, as well as precursors thereof (polyisocyanates, polyols or prepolymers).

O. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamide, poly-p-phenylene terephthalamide or poly-m-phenylene isophthalamide, as well as copolymers thereof with polyethers, such as for instance with polyethylene glycol, polypropylene glycol or polytetramethylene glycols.

P. Polyureas, polyimides and polyamide-imides

Q. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2-(4-hydroxyphenyl)-propane]terephthalate and polyhydroxybenzoates as well as block-copolyether-esters derived from polyethers having hydroxyl end groups.

R. Polycarbonates

S. Polysulfones, polyethersulfones and polyetherketones.

T. Crosslinked polymers which are derived from aldehydes on the one hand and phenols, ureas and melamines on the other hand, such as phenol/formaldehyde resins, urea/formaldehyde resins and melamine/formaldehyde resins.

U. Drying and non-drying alkyd resins.

V. Unsaturated polyester resins which are derived from copolyesters of saturated and unsaturated dicarboxylic acids with polyhydric alcohols and vinyl compounds as crosslinking agents, and also halogen-containing modifications thereof of low flammability.

W. Thermosetting acrylic resins, derived from substituted acrylic esters, such as epoxy-acrylates, urethane-acrylates or silicone-acrylates.

X. Alkyd resins, polyester resins or acrylate resins in admixture with melamine resins, urea resins, polyisocyanates or epoxide resins as crosslinking agents.

Y. Crosslinked epoxide resins which are derived from polyepoxides, for example from bis-glycidyl ethers or from cycloaliphatic diepoxides.

Z. Natural polymers, such as cellulose, rubber, gelatin and derivatives thereof which are chemically modified in a polymer homologous manner, such as cellulose acetates, cellulose propionates and cellulose butyrates, or the cellulose ethers, such as methyl cellulose.

AA. Mixtures of polymers as mentioned above, for example PP/EPDM, Polyamide 6/EPDM or ABS, PVC/EVA, PVC/ABS, PVC/MBS, PC/ABS, PBTP/ABS.

BB. Polysiloxanes.

CC. Polymers prepared from radiation curable compositions containing ethylenically unsaturated monomers and/or oligomers.

One or more organopolysulfides may be incorporated into a polymer or combination of polymers in an amount effective to improve the stability of the polymer. In general, the organodisulfides, organotrisulfides and/or organotetrasulfides of the present invention may be employed in total amounts representing from about 0.001 to about 5% by weight of the stabilized composition, although this will vary with the particular polymer, formulation, stabilizer and application. An advantageous range is from about 0.001 to about 2%, and especially about 0.001 to about 1% by weight in total of organodisulfide+organotrisultide+organotetrasulfide. A stabilized polymer composition in accordance with the invention may comprise at least 10, at least 20, at least 30, at least 40, at least 50, at least 75 or at least 100 ppm by weight in total of organopolysulfide, based on the total weight of polymer. According to certain embodiments, the stabilized polymer composition may comprise as much as 5%, as much as 4%, as much as 3%, as much as 2%, as much as 1%, as much as 0.5% or as much as 0.1% by weight in total of organopolysulfide, based on the total weight of polymer. For example, an organopolysulfide content of from 50 to 1000 ppm by weight, based on the total weight of polymer, may be utilized.

The organopolysulfide stabilizer component of the instant invention may readily be incorporated into a polymer by conventional techniques, at any convenient stage prior to the manufacture of shaped articles therefrom. For example, the organopolysulfide stabilizer component (optionally, together with one or more further additives, such as one or more hindered phenol antioxidants, phosph(on)ite stabilizers and/or hindered amine light stabilizers) may be mixed with the polymer in dry powder form (using, for example, extrusion or compounding methods), or a suspension or emulsion of the organopolysulfide stabilizer component may be mixed with a solution, suspension, or emulsion of the polymer.

In general, the organopolysulfide stabilizer component can be added to polymeric materials before, during or after the polymerization or cross-linking of said materials. The organopolysulfide stabilizer component can be incorporated into the polymer(s) to be stabilized in a pure form or encapsulated in waxes, oils or polymers. The organopolysulfide stabilizer component may be compounded into virgin resins, into post-processed recovered scraps, or into polymer reclaimed or recycled from post-consumer goods. Where the organopolysulfide stabilizer component is made up of more than one compound, the compounds may be combined with the polymer separately or as a pre-mixed blend.

Other Components and Additives

The stabilized polymer compositions of the invention may optionally also contain one or more various conventional polymer additives, such as the following:
1. Antioxidants, such as alkylated monophenols, including hindered alkylated monophenols; alkylated hydroquinones; hydroxylated thiodiphenyl ethers; alkylidene-bisphenols, benzyl compounds; acylaminophenols; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; and amides of beta-(3,5-di-tert-butyl-4-hydroxyphenyl)-propionic acid.
2. UV absorbers and light stabilizers, such as 2-(2'-hydroxyphenyl)-benzotriazoles; 2-hydroxy-benzophenones; esters of optionally substituted benzoic acids; acrylates; nickel compounds; sterically hindered amines; oxalic acid diamides; and hydroxyphenyl-s-triazines.
3. Metal deactivators.
4. Phosphites and phosphonites (sometimes collectively referred to as "phosph(or)ites").
5. Compounds which destroy peroxide.
7. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.
8. Nucleating agents, for example, 4-tert-butyl-benzoic acid, adipic acid, or diphenylacetic acid.
9. Fillers and reinforcing agents, for example, calcium carbonate, silicates, glass fibers, asbestos, talc, kaolin, mica, barium sulfate, metal oxides and hydroxides, carbon black, and graphite.
10. Other additives, for example, plasticizers, lubricants, emulsifiers, pigments, optical brighteners, flameproofing agents, fire retardants, anti-static agents, and blowing agents.

In at least certain cases, synergistic improvements in stabilization are obtained by using an organopolysulfide stabilizer component comprised of at least one organopolysulfide selected from the group consisting of organodisulfides, organotrisulfides, and organotetrasulfides in combination with one or more of the above-mentioned types of additives. In particular, the inventors have discovered that enhanced levels of stabilization in a polymer, such as a polyolefin, can be achieved by incorporating both an organopolysulfide stabilizer component and at least one further stabilization additive selected from the group consisting of hindered phenol antioxidants, phosph(on)ite stabilizers and hindered amine light stabilizers in the polymer.

Hindered phenol antioxidants are well known in the art. Particularly suitable hindered phenol antioxidants include alkylated hydroquinones and alkylated phenols, in particular aromatic compounds containing at least one tertiary butyl or amyl group attached to an aromatic ring carbon adjacent to a ring carbon to which a hydroxyl group is attached. Preferably, these compounds contain at least one group of the formula:

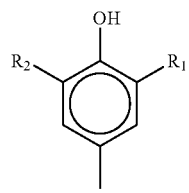

wherein $R_1$ is hydrogen, substituted or unsubstituted cycloalkyl, aryl, or araalkyl or substituted thioether having up to 18 carbon atoms and $R_2$ is a substituted or unsubstituted alkyl, cycloalkyl, aryl, or araalkyl or substituted thioether having up to 18 carbon atoms. The above phenolic compound may also be further substituted with additional substituents. According to certain embodiments, $R_1$ and $R_2$ are independently methyl or tert-butyl.

Suitable hindered phenol antioxidants include, for example, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 2,2'-methylenebis(6-tert-butyl-4-methylphenol), 2,2'-methylenebis(4,-ethyl-6-tert-butylphenol), 2,2'-methylenebis(6-tert-butyl-4-ethylphenol), 2,2'-methylenebis

[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α-α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-bydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,3,5-tris(3,5-di-tert-butyl-4-hydroxybenzyl)-2,4,6-trimethylbenzene, bis(3,5-di-tert-butyl-4-hydroxybenzyl)sulfide, isooctyl 3,5-di-tert-butyl-4-hydroxybenzylmercaptoacetate, bis(4-tert-butyl-3-hydroxy-2,6-dimethylbenzyl) dithioterephthalate, 1,3,5-tris(3,5-di-tert-butyl4-hydroxybenzyl) isocyanurate, 1,3,5-tris(4-tert-butyl-3-hydroxy-2,6-dimethylbenzyl)isocyanurate, dioctadecyl 3,5-di-tert-butyl-4-hydroxybenzylphosphonate and the calcium salt of monoethyl 3,5-di-tert-butyl-4-hydroxybenzylphosphonate, 2-propenoic acid 2-(1,1-dimethylethyl)-6-[[1,1-dimethylethyl)-2-hydroxy-5-methylphenyl]methyl]-4-methylphenylester, benzene propanoic acid 3,5,-bis(1,1-dimethyl-ethyl)-4-hydroxy-1,6, hexanediylester, benzene propanoic acid 3-(1,-dimethylethyl)-4-hydroxy)-5-methyl-1,2, ethanediylbis(oxy-2,1-ethanediyl)ester, 2,2,-ethylidene-bis-(4,6-ditert-butylphenol, 4,4',4"-(2,4,6-trimethyl-1,3,5-benzenetriyl)tris-(methylene)tris[2,6,-bis(1,1-dimethylethyl)phenol, 1,3,5tris(3,5-tert-butyl-4-hydroxybenzyl)-s-triazine-2,4,6-(1H,3-5H)-trione, octadecyl-3-5-di-tert-butyl-4-hydroxyhydrocinnamate, 1,3,5-tris(4-tert-butyl-3-hydroxy-2-6-dimethylbenzyl)-1,3,5-triazine-2,4,6-(1H,3H,5H)-trione, 1,3,5-trimethyl-2,4,6-tris(3,5-di-tert-butyl-4-hydroxybenzyl)benzene, 2,6-di-tert-butyl-n,d-dimethylamino-p-cresol, 2,2'-oxamido bis-[ethyl 3-(3,5-di-tert-butyl-4-hydroxyphenyl) propionate], 4-methyl-2,6-bis(1-phenylethyl)-phenol, triethyleneglycol-bis-(3-tert-butyl-4-hydroxy-5-methylphenyl) propionate, N,N'-hexamethylene-bis-(3,5-di-tert-butyl-4-hydroxy-hydrocinnamamide), 2,2'-methylene-bis-6-(1-methyl-cyclohexyl)-para-cresol, benzenepropanoic acid-3,5-bis(1,1-dimethylethyl)-4-hydroxy-C13-15-branched and linear alkyl esters, 2,2'-thiodiethyl bis-(3,5-di-tert-butyl-4-hydroxyphenyl) propionate, tocopherol and the like and combinations thereof.

As previously noted, hindered phenol antioxidants are known to have a tendency to generate highly colored species when present in a polymer composition that is processed at a relatively temperature (e.g., greater than 180° C.) either repeatedly or over an extended period of time. It has now been found that the use of organopolysulfides in accordance with the present invention in combination with such hindered phenol antioxidants helps to counteract such color development tendencies, especially at comparatively low levels relative to the amount of hindered phenol antioxidant. For example, in certain embodiments of the invention, a polymer composition containing hindered phenol antioxidant may be effectively stabilized against discoloration by including an amount of organopolysulfide such that a weight ratio of organopolysulfide: hindered phenol antioxidant is within the range of 5:95 to 80:20 or, more preferably, within the range of 10:90 to 50:50.

Phosph(on)ite stabilizers are also well known in the art. Particularly suitable phosph(on)ite stabilizers include esters of phosphorous acid (P(OH)$_3$) and phosphorous acid (P(OH)$_2$R), such as alkyl phosphites and aryl phosphites (especially hindered aryl phosphites). Phosph(on)ite stabilizers useful in this invention include, but are not limited to, phosphites and phosphonites having the formula (I) or (II):

$$P(OR_1)(OR_2)(OR_3) \quad \text{(I)}$$

$$P(R_1)(OR_2)(OR_3) \quad \text{(II)}$$

wherein at least one of the R groups is H or an alkyl or aryl substituent of up to and including 20 carbon atoms and the other R groups are the same or different groups having the same definition. One or more of the R groups may be an aryl (e.g., phenyl) group substituted with one or more t-butyl groups. The phosph(on)ite stabilizer may include more than one phosphorus atom per molecule (e.g., diphosph(on)ites, triphosph(on)ites). Specific examples of suitable phosph(on)ite stabilizers include tris(2,4-di-tert-butylphenyl)-phosphite, triphenylphosphite, diphenylphosphite, bis(2,4-di-tort-butylphenyl)-pentaerythritol diphosphonite, bis-(2,4-di-t-butylphenyl)pentaerythritol diphosphite, bis-(2,6-di-t-butyl-4-methylphenyl)pentaerythritol diphosphite, tri-(1-hexadecyl)-sorbitol-triphosphite, tri-(1-dodecanethiol)-sorbitol-triphosphite, 2,4,8,10-tetraoxa-3,9-diphosphaspiro[5.5]undecane, 3,9-bis(oetadecyloxy) and bis(3,5-di-t-butyl-4-hydroxy-benzyl) phosphite.

Any of the hindered amine light stabilizers ("HALS") known in the art may be utilized in the present invention. 2,2,6,6Tetramethyl piperidines are one type of useful hindered amine light stabilizer. Illustrative suitable hindered amine light stabilizers include bis (2,2,6,6-tetramethylpiperidyl)-sebacate; bis-5(1,2,2,6,6-pentamethylpiperidyl)-sebacate; n-butyl-3,5-di-tert-butyl-4-hydroxybenzyl malonic acid bis(1,2,2,6,6,-pentamethylpiperidyl)ester; condensation products of 1-hydraxyethyl-2,2,6,6-tetramethyl-4-hydroxypiperidine and succinic acid; condensation products of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4-butane-tetra-arbonic acid; and 1,1'(1,2-ethanediyl)-bis-(3,3,5,5-tetramethylpiperazinone). Additional hindered amine light stabilizers which may be employed in the present invention are described in United States Patent Publication No. 2017/0107336, the entire disclosure of which is incorporated herein by reference for all purposes.

The relative amounts of organopolysulfide stabilizer component and further stabilization additive(s) may be varied and controlled as may be appropriate depending upon the polymer to be stabilized, the types of organopolysulfide stabilizer component and further additive(s), and the degree and type of stabilization desired or needed for a particular application, among other factors. For example, the weight ratio of organopolysulfide stabilizer component to further stabilization additives may be 10:90 to 90:10 or 25:75 to 75:25. The total additive package loading (i.e., the total weight concentration of organopolysulfide stabilizer component+further stabilization additive(s) in the formulated resin could be 50 ppm to 3 wt %, preferably 0.05 wt % to 0.5 wt %.

According to certain embodiments, a stabilizer composition is provided which is comprised of, consists essentially of, or consists of an organopolysulfide stabilizer component comprised of at least one organopolysulfide selected from the group consisting of organodisulfides, organotrisulfides, and organotetrasulfides and one or more additional additives, in particular one or more additional additives selected from the group consisting of hindered phenol antioxidants, phosph(on)ite stabilizers and hindered amine light stabilizers. Such stabilizer compositions may be compounded or otherwise combined with a polymer to obtain stabilized polymer compositions in accordance with the present invention.

Also considered to be within the scope of the present invention are masterbatch compositions comprising at least one polymer and an organopolysulfide stabilizer component comprised of at least one organopolysulfide selected from the group consisting of organodisulfides, organotrisulfides, and organotetrasulfides, optionally further comprising one or more additional additives such as hindered phenol antioxidants, phosph(on)ite stabilizers and/or hindered amine light stabilizers, wherein the organopolysulfide stabilizer component is present in a concentration higher than the concentration desired in a particular end-use application for the polymer and the masterbatch is combined with a further quantity of the polymer to obtain a formulated polymer product suitable for such end-use application.

The stabilized polymer compositions of the present invention are useful for any of the applications in which polymer compositions are conventionally employed, such as the fabrication of articles such as containers, vehicle parts, electronic components, building components, appliance components, composites, coatings, pipes, films, sheets and the like, using techniques such as molding, casting, extrusion, sintering and so forth.

The stabilized polymer compositions of the present invention are particularly useful in coverings, jacketings or coatings applied to the outer surfaces of cables and other elements used in electric power generation and transmission, and other industrial applications where high temperatures are encountered. Such coverings, jacketings or coatings provide the coated cables and other elements with improved durability and/or increased heat emissivity and the stabilized polymer compositions of the present invention are useful to improve the aging properties of the covering, jacketing or coating on the object. Polymers used in such coverings, jacketings or coatings on cables and other objects can include acrylic copolymers, blends of acrylic copolymers with fluoropolymers including poly(vinylidene fluoride) (PVDF) homopolymers and copolymers, other kinds of fluoropolymers such as fluorinated ethylene vinyl ether (FEVE) and poly(vinyl fluoride) polymers, polyesters, epoxides, polyurethanes, polyolefins, ethylene-vinyl acetate copolymers, rubber compositions of various kinds, and siloxane-modified polymers of various kinds.

Various illustrative aspects of the invention may be summarized as follows:

Aspect 1: A stabilized polymer composition comprised of at least one polymer and an organopolysulfide stabilizer component comprised of at least one organopolysulfide selected from the group consisting of organodisulfides, organotrisulfides, and organotetrasulfides, Aspect 2: The stabilized polymer composition of Aspect 1, wherein the at least one organopolysulfide has structure $R^1$-$S(S)_x$-$R^2$, x is 1-3, and $R^1$ and $R^2$ are independently selected from $C_1$-$C_{30}$ organic groups.

Aspect 3: The stabilized polymer composition of Aspect 2, wherein the $C_1$-$C_{30}$ organic groups are selected from the group consisting of alkyl groups, aromatic groups and heterocyclic groups.

Aspect 4: The stabilized polymer composition of Aspect 2, wherein $R^1$ and $R^2$ are independently selected from $C_8$-$C_{16}$ alkyl groups.

Aspect 5: The stabilized polymer composition of Aspect 2, wherein each of $R^1$ and $R^2$ is tert-dodecyl.

Aspect 6: The stabilized polymer composition of any of Aspects 1 to 5, wherein the organopolysulfide stabilizer component is comprised of at least one organotrisulfide.

Aspect 7: The stabilized polymer composition of any of Aspects 1 to 6, wherein the organopolysulfide stabilizer component is comprised of at least one organodisulfide, at least one organotrisulfide and at least one organotetrasulfide.

Aspect 8: The stabilized polymer composition of Aspect 7, wherein the at least one organodisulfide has a structure $R^3$-SS-$R^4$, the at least one organotrisulfide has a structure $R^5$-SSS-$R^6$ and the at least one organotetrasulfide has a structure $R^7$-SSSS-$R^8$ wherein $R^3$, $R^4$, $R^5$, $R^6$, $R^7$ and $R^8$ are independently selected from $C_8$-$C_{16}$ alkyl groups.

Aspect 9: The stabilized polymer composition of Aspect 7 or 8, wherein the at least one organodisulfide, the at least one organotrisulfide, and the at least one organotetrasulfide together comprise at least 90% by weight of the organopolysulfide stabilizer component.

Aspect 10: The stabilized polymer composition of any of Aspects 7 to 9, wherein the at least one organodisulfide, the at least one organotrisulfide and the at least one organotetrasulfide are present in a weight ratio of organotrisulfide (organodisulfide+organotetrasulfide) of from 70:30 to 90:10.

Aspect 11: The stabilized polymer composition of any of Aspects 1 to 10, wherein the organopolysulfide stabilizer component is comprised of less than 15% by weight of organopolysulfides other than organodisulfides and organotrisulfides.

Aspect 12: The stabilized polymer composition of claim 1, wherein the organopolysulfide stabilizer is comprised of at least one aromatic polysulfide corresponding to formula (I):

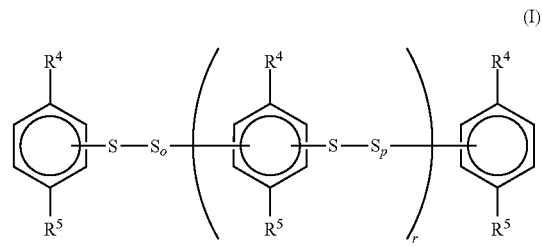

wherein each $R^4$ is independently tert-butyl or tert-amyl, $R^5$ is hydroxyl (—OH), o and p are each independently 0 or 1, with at least one of o or p being 1, and r is 0 or an integer of 1 or more, with the aromatic rings being optionally substituted in one or more positions with substituents other than hydrogen.

Aspect 13: The stabilized polymer composition of Aspect 12, wherein none of the aromatic rings are substituted at positions ortho to the $R^5$ (hydroxyl) group with substituents other than hydrogen.

Aspect 14: The stabilized polymer composition of Aspect 12 or 13, wherein r=1-20, each $R^5$=t-amyl or t-butyl, o=1, and p=1.

Aspect 15: The stabilized polymer composition of any of Aspects 12 to 14, wherein r=1-6, each $R^5$=t-amyl or t-butyl, o=1, and p=1.

Aspect 16: The stabilized polymer composition of Aspect 1, wherein the organopolysulfide stabilizer component is comprised of at least one thiuram polysulfide.

Aspect 17: The stabilized polymer composition of Aspect 16, wherein the at least one thiuram polysulfide is a tetraalkyl thiuram disulfide.

Aspect 18: The stabilized polymer composition of any of Aspects 1 to 17, wherein the at least one polymer comprises at least one thermoplastic.

Aspect 19: The stabilized polymer composition of any of Aspects 1 to 17, wherein the at least one polymer comprises at least one elastomer.

Aspect 20: The stabilized polymer composition of any of Aspects 1 to 17, wherein the at least one polymer is selected from the group consisting of styrenic resins, polyolefin resins, acrylic resins and polyoxymethylene resins.

Aspect 21: The stabilized polymer composition of any of Aspects 1 to 17, wherein the at least one polymer is selected from the group consisting of polystyrenes, polymethyl methacrylates, polypropylenes and polyethylenes.

Aspect 22: The stabilized polymer composition of any of Aspects 1 to 21, wherein the stabilized polymer composition is comprised of from 0.001 to 1% by weight of the organopolysulfide stabilizer component.

Aspect 23: The stabilized polymer composition of any of Aspects 1 to 22, wherein the stabilized polymer composition is additionally comprised of at least one stabilizer other than an organopolysulfide stabilizer.

Aspect 24: The stabilized polymer composition of Aspect 23, wherein the at least one stabilizer other than an organopolysulfide stabilizer is selected from the group consisting of antioxidants, antiozonants and UV stabilizers.

Aspect 25: The stabilized polymer composition of Aspect 23 or 24, wherein the at least one stabilizer other than an organopolysulfide is selected from the group consisting of hindered phenol antioxidants, phosph(on)ite stabilizers, hindered amine light stabilizers and combinations thereof.

Aspect 26: A method of stabilizing a polymer, comprising combining the polymer with an organopolysulfide stabilizer component comprised of at least one organopolysulfide selected from the group consisting of organodisulfides, organotrisulfides and organotetrasulfides.

Aspect 27: The method of Aspect 26, wherein the method produces a polymer composition which exhibits a lower degree of at least one of weight loss or color development when processed at a high temperature as compared to the polymer in the absence of the organopolysulfide stabilizer component. A further aspect is as follows: The method of Aspect 26, wherein the polymer is also combined with an amount of at least one hindered phenol antioxidant and the polymer composition produced exhibits a lower degree of color development when processed at a high temperature (e.g., greater than 180° C.) as compared to a polymer composition containing the polymer and the amount of at least one hindered phenol antioxidant but not the organopolysulfide stabilizer component.

Aspect 28: A stabilizer composition comprising i) an organopolysulfide stabilizer component comprised of at least one organopolysultide selected from the group consisting of organodisulfides, organotrisulfides, and organotetrasulfides and ii) one or more additional additives selected from the group consisting of hindered phenol antioxidants, phosph(on)ite stabilizers and hindered amine light stabilizers.

Aspect 29. An object which is covered, jacketed, or coated with the stabilizer polymer composition of any of Aspects 1 to 25.

Aspect 30. An object of Aspect 29 wherein the object is an electric power transmission cable.

Aspect 31. An object of one of Aspects 29 or 30 wherein the stabilized polymer composition comprises acrylic polymer, PVDF polymer, or a blend of acrylic and PVDF polymers.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Methodology

Example 1

Experimental samples for thermal stability testing were prepared using a twin screw micro DSM. Polymers were compounded with certain sulfide additives at levels of 800 ppm. Both the polymer and the additive were introduced into the system at 220° C. and compounded for 3 minutes at 25 rpm under a nitrogen atmosphere, The stability of the resulting polymer compositions was measured by isothermal gravimetric analysis. Samples were weighed into an aluminum weigh boat (usually in an amount of 1.5 g) and placed in a forced air circulation oven at a given temperature (180-260° C.) for a set period of time (1-6 hours). After the polymer composition was allowed to cool, the final temperature of the polymer composition was measured and the remaining weight of the polymer composition was determined. Stability was measured as a function of the amount of weight loss after heating.

The additives used were as follows:

Additive A: di-tert-dodecyl disulfide (CAS No. 27458-90-8), corresponding to structure R-SS-R', wherein R and R' are the same as or different from each other and are $C_{10}$-$C_{13}$ branched aliphatic groups (designation in Figures: "polysulfide 1a" or "polysul 1a").

Additive B. di-tert-dodecyl polysulfide blend (CAS No. 68425-15-0), corresponding to structure R-SS$_x$-R', wherein R and R' are the same as or different from each other and are $C_{10}$-$C_{14}$ branched aliphatic groups and x=1-3 (i.e., disulfide, disulfide and tetrasulfide species are present, with trisulfide being the predominant species) (designation in Figures: "polysulfide 1b" or "polysol 1b").

Additive C: di-tert-dodecyl polysulfide blend (CAS No. 68425-15-0), corresponding to structure R-SS$_x$-R', wherein R and R' are the same as or different from each other and are $C_{10}$-$C_{14}$ branched aliphatic groups and x=2-5 (i.e., trisulfide, tetrasulfide, pentasulfide and hexasulfide species are present, with tetrasulfide and pentasulfide being the predominant species) (designation in Figures: "polysulfide 1c" or "polysol 1c").

Vultac® 2 poly(p-tert-amylphenol disulfide) (CAS No. 68555-98-6), product of The Arkema Group (designation in Figures: "polysulfide 2a or polysul 2a") and having the following structure:

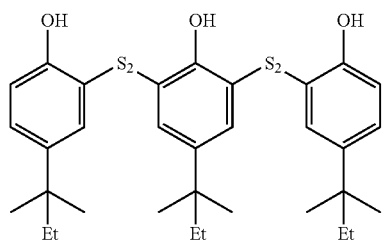

Vultac® 3 Poly(p-tert-amylphenol disulfide) (CAS No. 68555-98-6), product of The Arkema Group (designation in Figures: "polysulfide 2b or polysul 2b") and having the following structure:

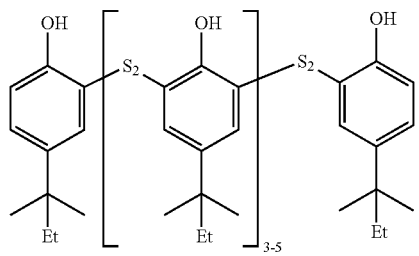

Vultac® 7 Poly(p-tert-butyphenol disulfide) (CAS No. 60303-68-6), product of The Arkema Group (designation in Figures: "polysulfide 2c or polysul 2c") and having the following structure:

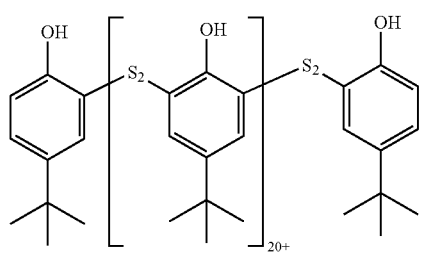

Irgafos® 168 tris(2,4-di-tert-butylphenyl)phosphite, sold by BASF (designation in Figures: "AO 168").

Irganox® 1010 pentaerythitol tetrakis(3,5-di-tert-butyl-4-hydroxyhydrocinnamate), sold by BASF (designation in Figures: "AO 1010").

Tinuvin® 770 bis(2,2,6,6-tetramethyl-4-piperidyl) sebaeate, sold by BASF (designation in Figures: "HALS 770").

Tetramethylthiuram disulfide (designation in Figures: "Thiuram"),

The percent weight loss observed for polystyrene containing either no additive (Control) or 800 ppm of Additive A, Additive B or Vultac® 3 after 1 and 2 hours at 260° C. is shown in FIG. 1.

Figure 2:
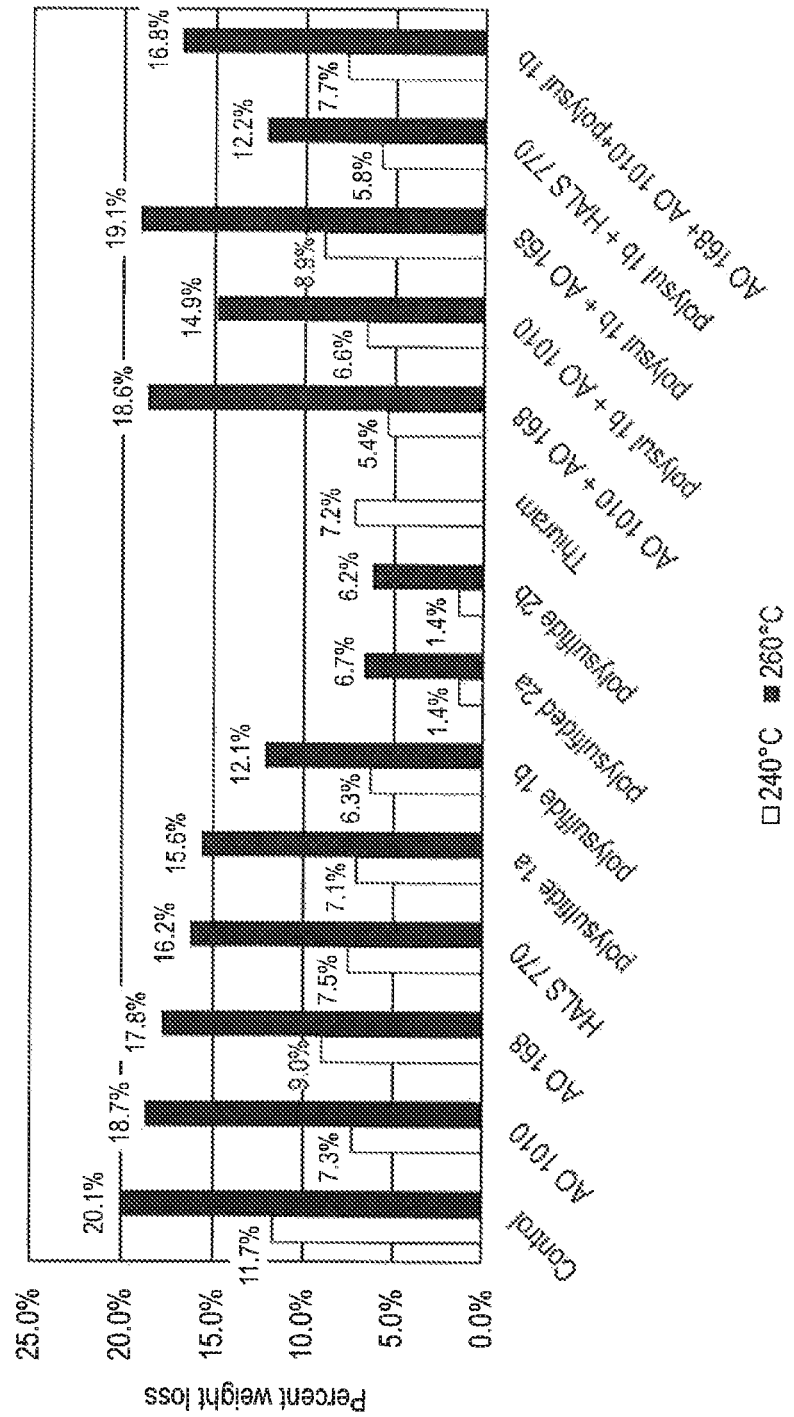

The percent weight loss observed for polypropylene containing either no additive (Control) or 800 ppm of various additives or combinations of additives (containing 400 ppm of each of the stabilizers) after 1 hour at 240° C. or 260° C. is shown in FIG. 2.

Figure 3:
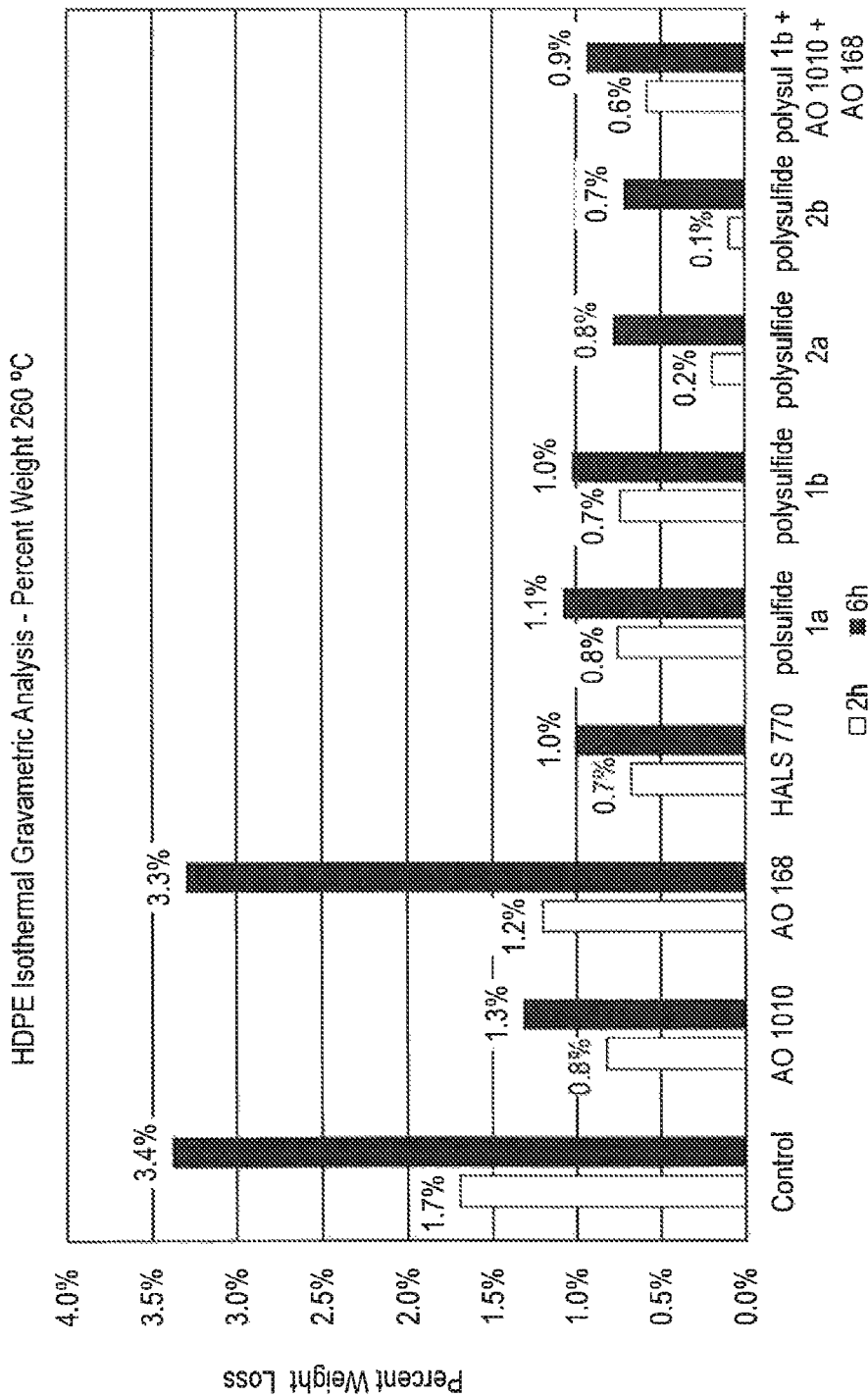

The percent weight loss observed for high density polyethylene (HDPE) containing either no additive (Control) or 800 ppm of various additives or combinations of additives (containing 400 ppm of each of the additives) after 2 and 6 hours at 260° C. is shown in FIG. 3.

Figure 4:
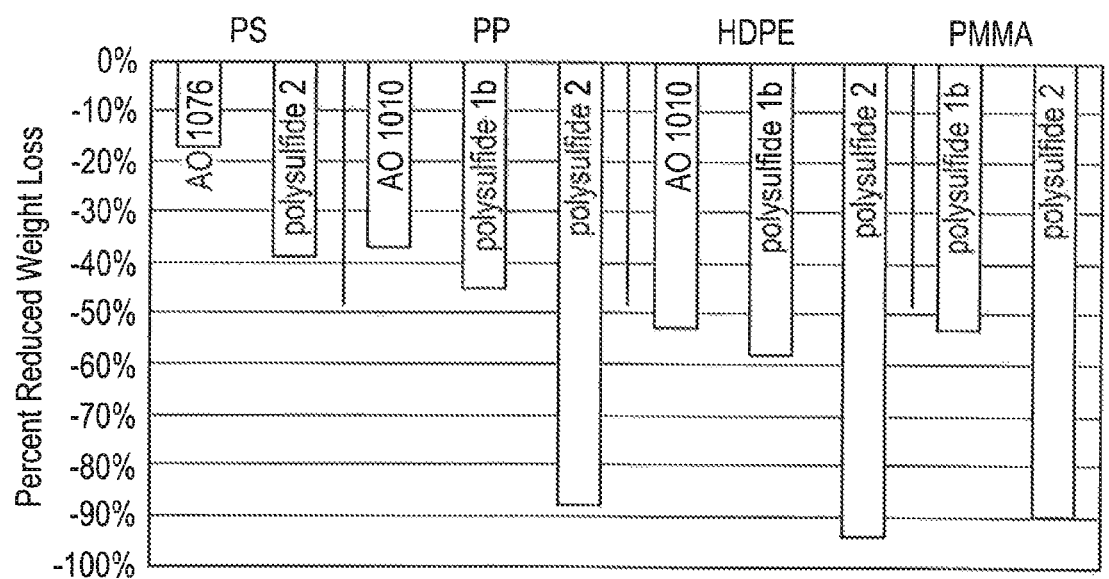

FIG. 4 shows the reduction in weight loss as compared to a control (no stabilizer), as measured in the above-described tests.

Example 2

This example demonstrates the effect of various additives, and combinations of additives, on the stability of HDPE (high density polyethylene).

Figure 5:
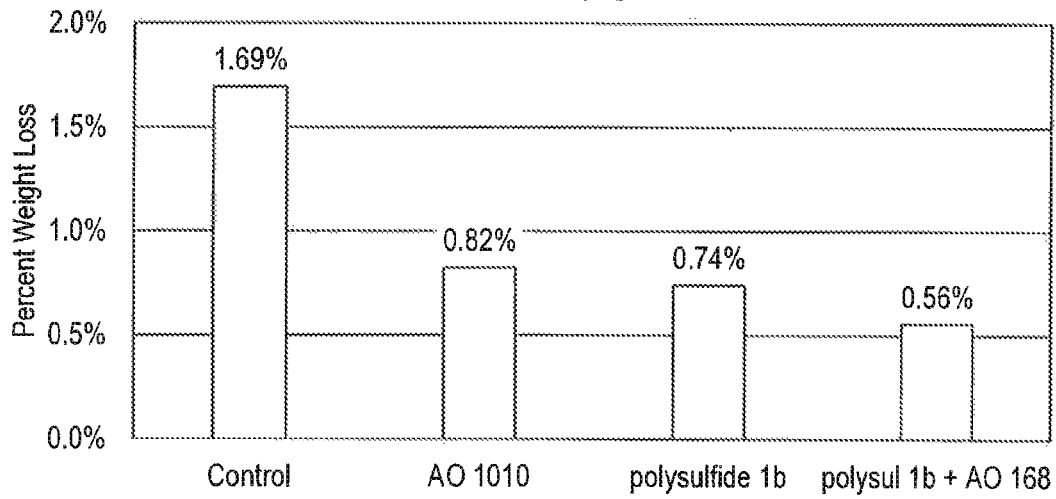

Sample preparation and testing: In each case, the component or components of the sample were compounded in a DSM microcompounder at 25 RPM under nitrogen for 3 minutes. The resulting material was then extruded and cooled to room temperature. Each extrudate was massed into an aluminum dish and baked in an air oven at 260° C. for 6 hours. The weight loss was measured at 2 and 6 hours, as reported in FIG. 5. The sample compositions are set forth in Table 1. The composition of the "polysulfide 1b" component is described in Example 1.

TABLE 1

| Component | Sample 2-A (control) | Sample 2-B | Sample 2-C | Sample 2-D |
|---|---|---|---|---|
| HDPE | 10 g | 10 g | 10 g | 10 g |
| Polysulfide 1b | — | 100 mg | — | 50 mg |
| Irganox ® 1010 | — | — | 100 mg | 50 mg |

As compared to the control (Sample 2-A) with no additive included, both Polysulfide 1b (Sample 2-B) and Irganox® 1010 (Sample 2-C) were effective in reducing the weight loss observed upon heating at 260° C. in air. However, using Zip 2 and Irganox® 1010 in combination (Sample 2-D) resulted in a synergistic stabilization of the HDPE. Thus, it was concluded that there is a clear advantage to using the combination of Polysulfide 1b and Irganox® 1010 as compared to using any one individual additive. Compared to Irganox® 1010 alone, the thermal decomposition is reduced by 30% and compared to Polysulfide 1b alone, the thermal decomposition is reduced by 25%. Overall, the additive combination reduced the amount of thermal decomposition by 65% as compared to the control sample.

Example 3

This example demonstrates the effect of various additives, and combinations of additives, on the stability of LDPE (low density polyethylene).

Figure 6:
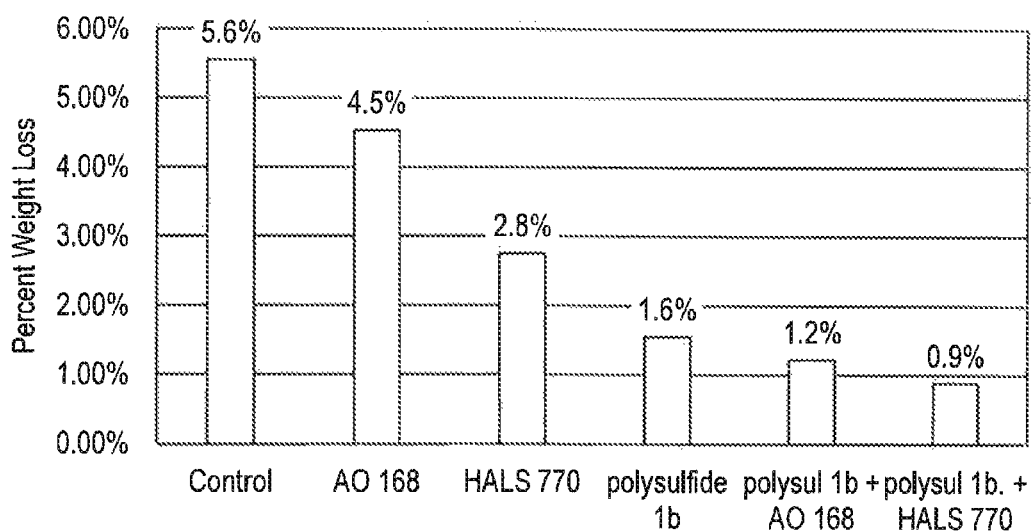

Sample preparation and testing: In each case, the component or components of the sample were compounded in a DSM microcompounder at 25 RPM under nitrogen for 3 minutes. The resulting material was then extruded and cooled to room temperature. Each extrudate was massed into an aluminum dish and baked in an air oven at 260° C. for 6 hours. The weight loss was measured at 2 and 6 hours, as reported in FIG. 6. The sample compositions are set forth in Table 2.

TABLE 2

| Component | Sample 3-A (control) | Sample 3-B | Sample 3-C | Sample 3-D | Sample 3-E | Sample 3-F |
|---|---|---|---|---|---|---|
| LDPE | 10 g | 10 g | 10 g | 10 g | 10 g | 10 g |
| Polysulfide 1b | — | 100 mg | — | — | 50 mg | 50 mg |
| Irgafos ® 168 | — | — | 100 mg | — | 50 mg | — |
| Tinuvin ® 770 | — | — | — | 100 mg | — | 50 mg |

As compared to the control (Sample 2-A) with no additive included, Polysulfide 1b alone (Sample 3-B) was effective in reducing the weight loss observed upon heating at 260° C. in air. However, using Polysulfide 1b and Irganox® 168 in combination (Sample 3-E) or Polysulfide 1b and Tinuvin® 770 in combination (Sample 3-F) resulted in a synergistic stabilization of the LDPE. Thus, it was concluded that there is a clear advantage to using the combination of Polysulfide 1b and Irganox® 168 or the combination of Polysulfide 1b and Tinuvin® 770 as compared to using any one individual additive.

Figure 7:
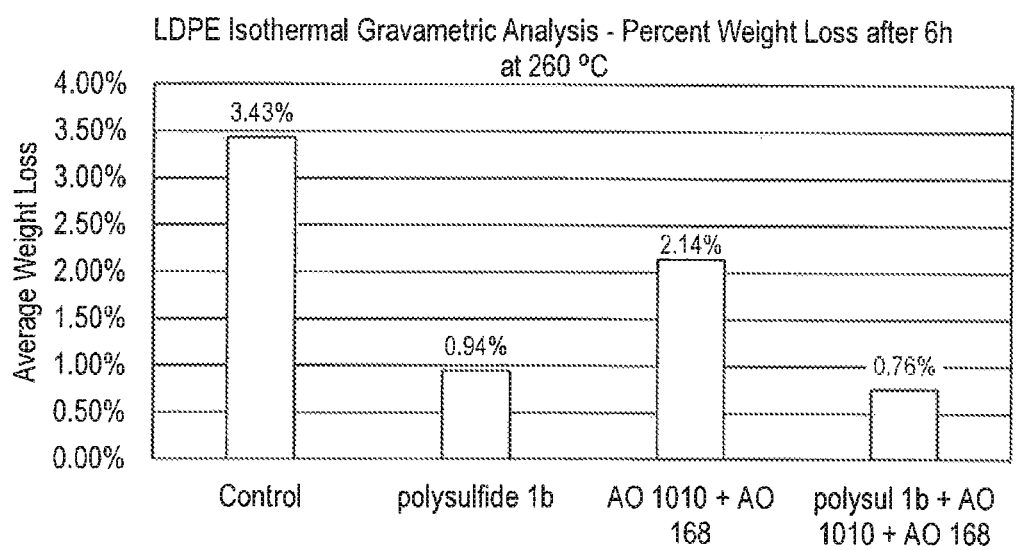

Further studies were performed using samples having the compositions set forth in Table 3, following the same sample preparation and testing procedure described previously. The results obtained are illustrated in FIG. 7.

TABLE 3

| Component | Sample 3-G | Sample 3-H |
|---|---|---|
| LDPE | 10 g | 10 g |
| Polysulfide 1b | — | 33 mg |
| Irgafos ® 168 | 50 mg | 33 mg |
| Tinuvin ® 770 | 50 mg | 33 mg |

These results demonstrate the advantages of including the Polysultide 1b additive in the resin formulation. Weight loss due to thermal stress was reduced by over 50% when Polysulfide 1b was present, in accordance with the present invention, as compared to the use of just Irgafos® 160 and Tinuvin® 770 as additives. Moreover, benefits were observed when the Polysulfide 1b was utilized in combination with the other two additives.

Example 4

This example demonstrates the effect of various additives, and combinations of additives, on the stability of polypropylene.

Figure 8:
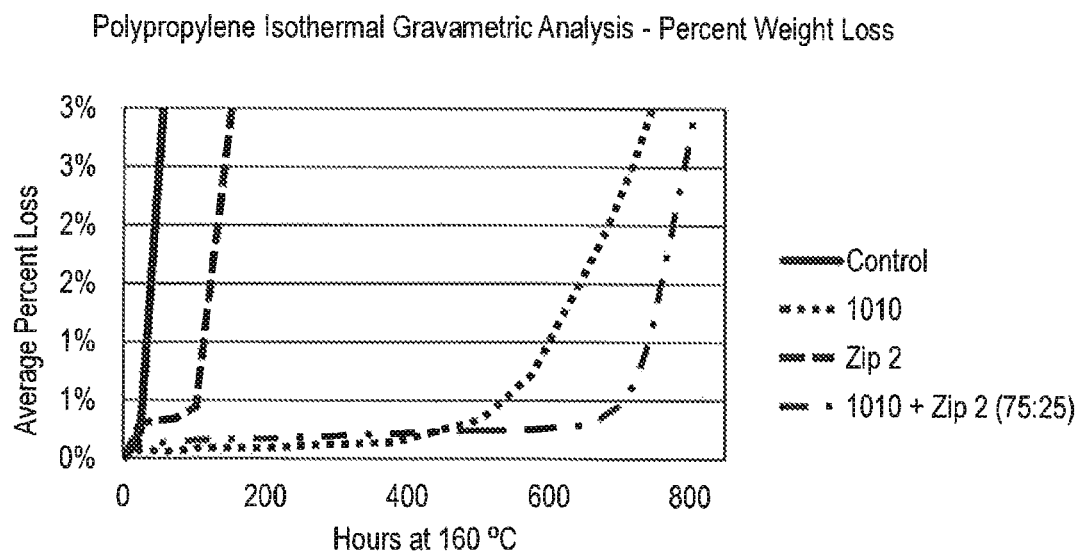

Sample preparation and testing: In each case, the component or components of the sample were compounded in a DSM microcompounder at 25 RPM under nitrogen for 3 minutes. The resulting material was then extruded and cooled to room temperature. Each extrudate was massed into an aluminum dish and baked in an air oven for at 160° C. for 800 hours. The weight loss was measured at 800 hours, as reported in FIG. 8. The sample compositions are set forth in Table 4.

TABLE 4

| Component | Sample 4-A (control) | Sample 4-B | Sample 4-C | Sample 4-D |
|---|---|---|---|---|
| Polypropylene | 10 g | 10 g | 10 g | 10 g |
| Polysulfide 1b | — | 100 mg | — | 25 mg |
| Irganox ® 1010 | — | — | 100 mg | 75 mg |

The combination of Polysulfide 1b and irganox® 1010 (Sample 4-D) prolongs the time until significant weight loss is observed by more than 200 h, as compared to the control (Sample 4-A).

Example 5

This example demonstrates the effect of various additives, on the stability of a coating formulation based upon a blend of PAIDF and acrylic copolymers.

A base waterborne paint formulation at 46 wt % solids was prepared using Arkema's Kynar Aquatec® FMA-12 hybrid emulsion polymer. The FMA-12 product contains 50% PVDF copolymer and 50% acrylic copolymer by weight on total polymer solids. The base paint formulation also contained rutile titanium dioxide pigment (Chemours' TiPure® R-960), a black mixed metal oxide pigment (Shepherd Color Company 30C965), and 399 mesh talc filler, giving a dried paint composition by weight of 37:2:15:23:23 TiO2:black pigment:talc:PVDF copolymer:acrylic copolymer. To incorporate the polysuifide additives into the base paint formulation, 10 wt % solutions of the additives in a cosolvent of dipropylene glycol n-butyl ether (DPnB) were prepared. 1.3 g of the additive solution (or for the control, 1.3 g of neat DPnB) were added to 100 g of the base waterborne formulation to give a series of paints containing 0.6% additive on total polymer weight. The paints were cast on eliminated aluminum panels using a Bird Applicator and dried over a weekend at 60 C to removing any remaining water and cosolvent, giving dried coatings of about 50 microns thickness, with dry coating compositions set forth in Table 5:

TABLE 5

| Component | Sample 5-A (control) | Sample 5-B | Sample 5-C | Sample 5-D |
|---|---|---|---|---|
| PVDF copolymer | 50 parts | 50 parts | 50 parts | 50 parts |
| Acrylic copolymer | 50 parts | 50 parts | 50 parts | 50 parts |
| Pigments and fillers (inert) | 117 parts | 117 parts | 117 parts | 117 parts |
| polysulfide 1a | — | 0.6 parts | — | — |
| polysulfide 1b | — | — | 0.6 parts | — |
| polysulfide 2c | — | — | — | 0.6 parts |

Figure 9:
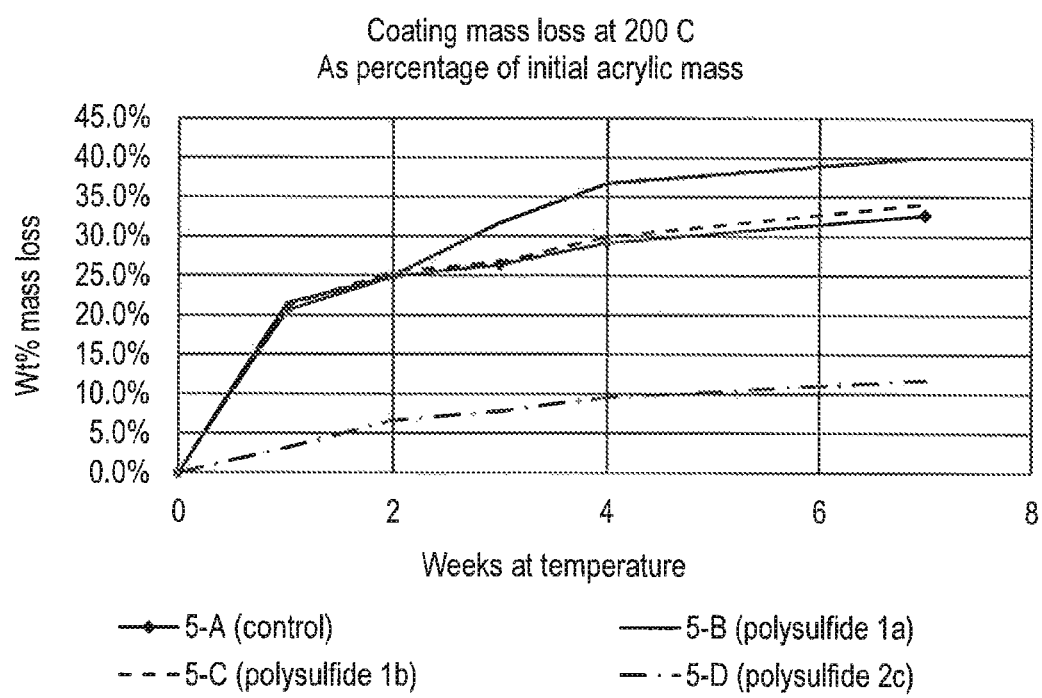

The coated panels were cut to a sample size of about 60 mm×80 mm and baked in an air oven at 200° C. for 7 weeks. The sample mass loss was measured on a weekly basis, as reported in FIG. 9. (Mass loss is reported as a percentage of the acrylic mass since the other coating components have a much greater thermal stability). The polysulfide additive 2c (Sample 5-D) greatly reduced the rate of mass loss throughout the 7 week study, compared to the control (Sample 5-A) and the other polysulfide additives.

The waterborne paint formulation of Sample 5-D was applied at ambient temperature, using a spray application method, to a 30 mm diameter steel-reinforced aluminum electrical conductor cable. After drying at ambient temperature, a continuous polymer paint film of the present invention was obtained, with a dry film thickness of 20-30 microns.

Example 6

This Example demonstrates the ability of organopolysulfides to stabilize polymer compositions containing hindered phenol antioxidants against changes in color after repeated extrusions at high melt temperatures.

Polymer compositions were prepared using the following components:

Pro-fax 6331 polypropylene, melt flow rate (230° C./2.16 kg=12 g/10 min), sold by LyondellBasell.

Irganox® 1010 pentaerythitol tetrakis(3,5-di-tert-butyl4-hydroxyhydrocinnamate), sold by BASF.

Distearyl thiodipropionate (DSTDP), sold by TCI Chemicals.

Irgafos® 168 tris(2,4-di-tert-butylphenyl)phosphite, sold by BASF.

Additive A di-tert-dodecyl disulfide (designation in Figures: "polysulfide 1a").

Additive B di-tert-dodecyl polysulfide (designation in Figures: "polysulfide 1b").

Appropriate amounts of additives, as stated in Table 6, were weighed out and mixed with the polypropylene in a plastic bag (generally about 500 grams of material in total per sample). The amounts shown in Table 6 of each additive are in ppm, based on the total weight of the polymer composition. Each mixture was first double-passed through a 27 mm twin-screw extruder at a melt temperature of 180° C. Each sample was then extruded in a benchtop Randcastle Microtruder, operated at 50 rpm with the temperature settings shown in Table 7. The mixtures were extruded up to seven times in total. Samples were taken at passes 1, 3, 5 and 7.

TABLE 6

| Sample | Irganox® 1010 | Irgafos® 168 | Polysulfide 1a | Polysulfide 1b | DSTDP |
|---|---|---|---|---|---|
| 6-A* | 0 | 0 | 0 | 0 | 0 |
| 6-B* | 500 | 1000 | 0 | 0 | 0 |
| 6-C | 500 | 1000 | 1000 | 0 | 0 |
| 6-D | 500 | 0 | 0 | 1000 | 0 |
| 6-E | 500 | 1000 | 0 | 1000 | 0 |
| 6-F* | 500 | 0 | 0 | 0 | 1000 |
| 6-G* | 500 | 1000 | 0 | 0 | 1000 |

*= comparative

TABLE 7

| Zone Setting | 1 | 2 | 3 | 4 | Die |
|---|---|---|---|---|---|
| Setting (° C.) | 177 | 227 | 232 | 243 | 243 |

Figure 10:
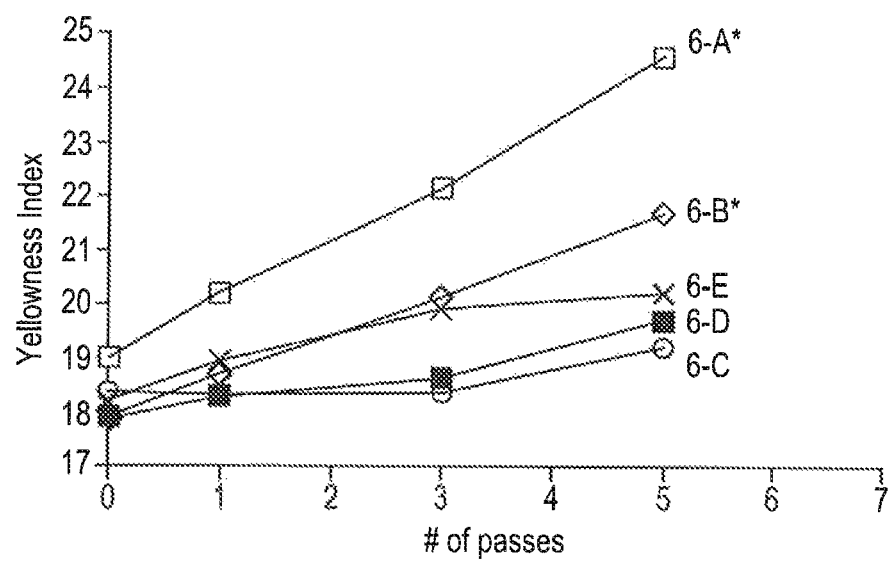
Figure 11:
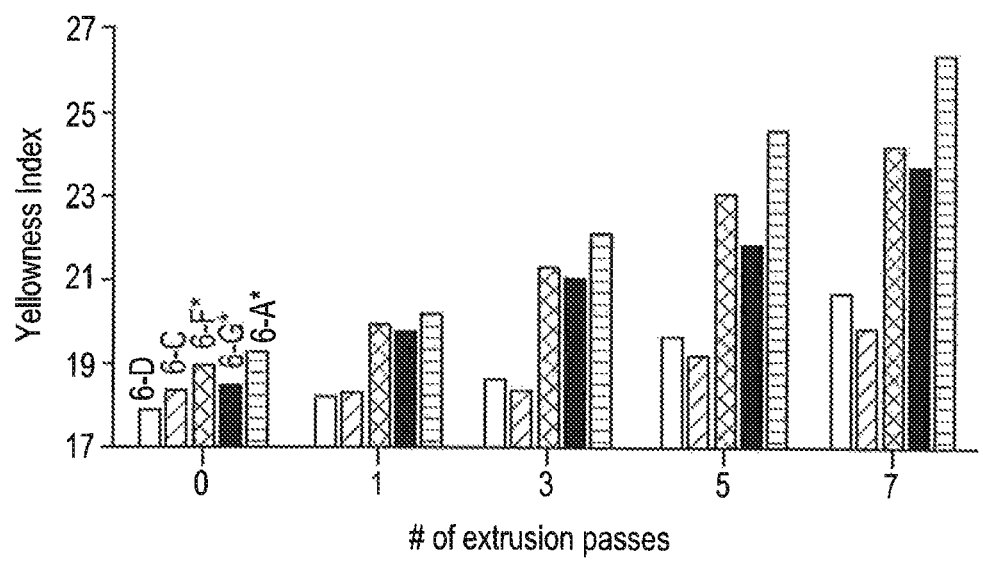

Yellowness index testing: The yellowness index of each sample was tested using injection molded tensile bars on a Konica Minolta CR-400 Chroma Meter in accordance with ASTM E313. The results obtained are shown in FIG. 10 and FIG. 11. The figures dearly show that less color is formed in the formulations which contained an organopolysulfide in accordance with the invention, as compared to formulations which did not contain any organopolysulfide. Additionally, the organopolysulfides were found to be more effective in suppressing color development at high processing temperatures (greater than 180° C.) than dioctadecyl 3,3'-thiodipropionate (CAS-NO: 693-36-7, DSDTP), a different type of sulfur-containing compound conventionally used as a processing stabilizer in polymer compositions.

Example 7

Samples of various polymer compositions were prepared as generally described in Example 6 by mixing a base polypropylene with varying levels of different additives as indicated in Table 8 (the amounts of additives are in ppm by weight; the total amount of additives was 1500 ppm in each sample). However, in this Example, the mixing was performed using a single screw Randcastle RCP 0625 Microtruder with three mixing elements in which all the temperature zones were maintained at 180° C. The mixtures of polymer and additives were passed through the extruder twice under these conditions. Measurements of melt flow and yellowness index were taken to ensure that no significant decomposition of the polymer had occurred during the mixing. The completed formulations were then passed through the extruder at more aggressive (i.e., higher) temperatures. The heating profile used (i.e., the heating settings on the extruder) was the same as that shown in Table 7.

TABLE 8

| Sample | Irganox® 1010 | Polysulfide 1a |
|---|---|---|
| 7-A* | 1500 | 0 |
| 7-B | 1350 | 150 |
| 7-C | 1200 | 300 |
| 7-D | 1050 | 450 |
| 7-E | 900 | 600 |
| 7-F | 750 | 750 |
| 7-G | 600 | 900 |
| 7-H | 450 | 1050 |
| 7-I | 300 | 1200 |
| 7-J | 150 | 1350 |
| 7-K* | 0 | 1500 |

*= comparative example

Figure 12:
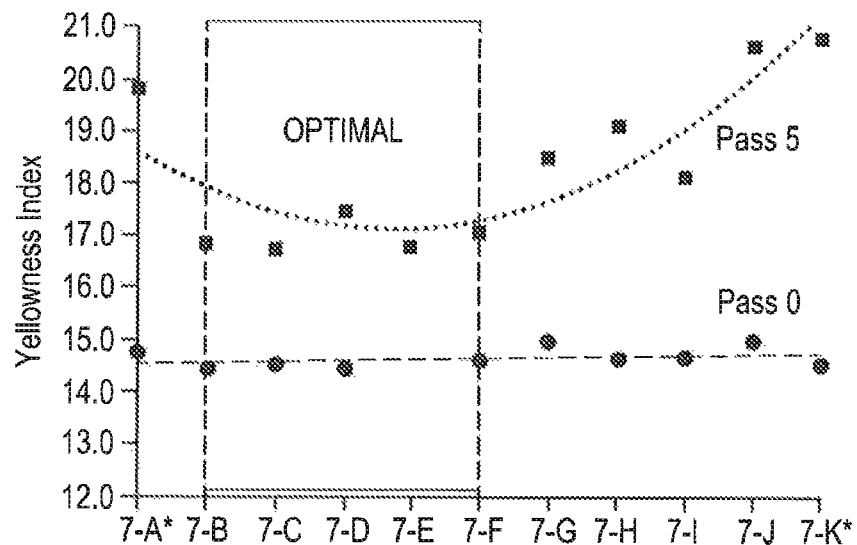
Figure 13:
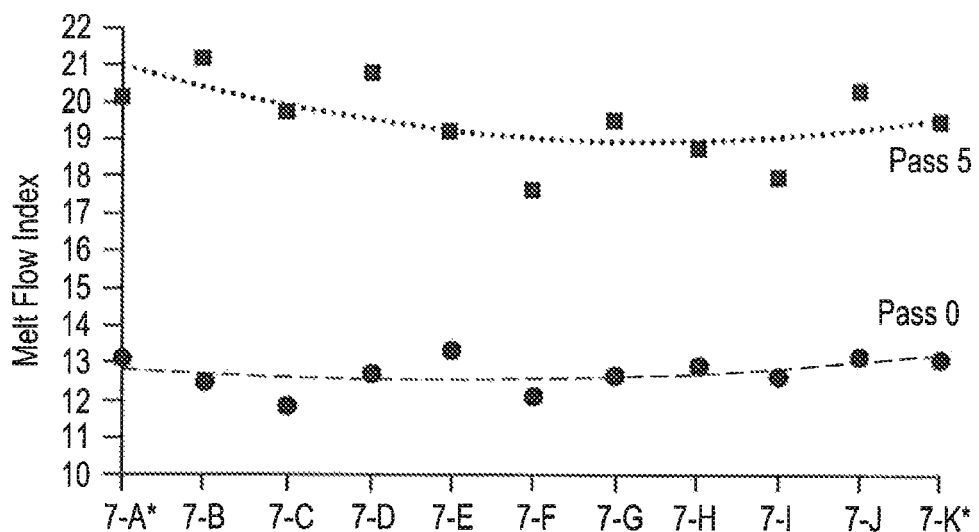

FIG. 12 is a plot of the yellowness index change as a function of the additive package and the concentration of antioxidant. The test results show that combining even a small amount of organopolysulfide with a primary hindered phenol antioxidant such as Irganox® 1010 has a dramatic favorable effect on color development. Formulations containing only the hindered phenol antioxidant exhibited an increase in yellowness index of approximately 5 units after five passes through the extruder. Replacing 10% of the hindered phenol antioxidant with the organopolysulfide resulted in a 60% decrease in color generation. After five passes through the extruder under the above-stated conditions, an increase in the yellowness index of only two units was observed. FIG. 13 is a plot of the melt flow index of each sample formulation before and after the extruder processing. This figure shows the degree of change in melt flow index as a function of processing is essentially unaffected by the additive content.

What is claimed is:

1. A stabilized polymer composition comprised of at least one polymer selected from the group consisting of thermoplastic polymers and elastomeric polymers, and an organopolysulfide stabilizer component comprised of an organopolysulfide blend comprised of at least one organodisulfide, at least one organotrisulfide and at least one organotetrasulfide in combination with an additive selected from the group consisting of one or more phosph(on)ites, one or more hindered amines and mixtures thereof wherein the stabilized polymer composition is in the form of a shaped article.

2. The stabilized polymer composition of claim 1, wherein the at least one organodisulfide has a structure $R^3$-SS-$R^4$, the at least one organotrisulfide has a structure $R^5$-SSS-$R^6$ and the at least one organotetrasulfide has a structure $R^7$-SSSS-$R^8$ wherein $R^3$, $R^4$, $R^5$, $R^6$, $R^7$ and $R^8$ are independently selected from $C_1$-$C_{30}$ alkyl groups.

3. The stabilized polymer composition of claim 2, wherein each of $R^3$, $R^4$, $R^5$, $R^6$, $R^7$ and $R^8$ is tert-dodecyl.

4. The stabilized polymer composition of claim 2, wherein $R^3$, $R^4$, $R^5$, $R^6$, $R^7$ and $R^8$ are independently selected from $C_8$-$C_{16}$ alkyl groups.

5. The stabilized polymer composition of claim 1, wherein the at least one organodisulfide, the at least one organotrisulfide, and the at least one organotetrasulfide together comprise at least 90% by weight of the organopolysulfide stabilizer component.

6. The stabilized polymer composition of claim 1, wherein the at least one organodisulfide, the at least one organotrisulfide and the at least one organotetrasulfide are present in a weight ratio of organotrisulfide: (organodisulfide+organotetrasulfide) of from 70: 30 to 90: 10.

7. The stabilized polymer composition of claim 1, wherein the organopolysulfide stabilizer component is comprised of less than 15% by weight of organopolysulfides other than organodisulfides and organotrisulfides.

8. The stabilized polymer composition of claim 1, wherein at least one of said organodisulfides, organotrisulfides, and organotetrasulfides is comprised of a thiuram polysulfide.

9. The stabilized polymer composition of claim 8, wherein the at least one thiuram polysulfide is a tetraalkyl thiuram disulfide.

10. The stabilized polymer composition of claim 1, wherein the at least one polymer is selected from the group consisting of styrenic resins, polyolefin resins, acrylic resins and polyoxymethylene resins.

11. The stabilized polymer composition of claim 1, wherein the at least one polymer is selected from the group consisting of polystyrenes, polymethyl methacrylates, polypropylenes and polyethylenes.

12. The stabilized polymer composition of claim 1, wherein the stabilized polymer composition is comprised of from 0.001 to 1% by weight of the organopolysulfide stabilizer component.

13. An object which is covered, jacketed, or coated with the stabilizer polymer composition of claim 1.

14. An object of claim 13 wherein the object is an electric power transmission cable.

15. An object of claim 13 wherein the stabilized polymer composition comprises acrylic polymer, PVDF polymer, or a blend of acrylic and PVDF polymers.

* * * * *